US009753439B2

(12) United States Patent
Armstrong et al.

(10) Patent No.: US 9,753,439 B2
(45) Date of Patent: Sep. 5, 2017

(54) MULTI-PROTOCOL DEVICE SUPPORTING WIRELESS PLANT PROTOCOLS

(71) Applicant: FISHER-ROSEMOUNT SYSTEMS, INC., Round Rock, TX (US)

(72) Inventors: Stephen Armstrong, Savage, MN (US); Duncan Schleiss, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 171 days.

(21) Appl. No.: 14/504,711

(22) Filed: Oct. 2, 2014

(65) Prior Publication Data

US 2016/0100437 A1    Apr. 7, 2016

(51) Int. Cl.
| | |
|---|---|
| *G05B 19/418* | (2006.01) |
| *G05B 11/01* | (2006.01) |
| *H04W 4/02* | (2009.01) |
| *H04W 24/04* | (2009.01) |
| *H04W 84/12* | (2009.01) |

(52) U.S. Cl.
CPC ........... *G05B 11/012* (2013.01); *H04W 4/023* (2013.01); *H04W 24/04* (2013.01); *H04W 84/12* (2013.01)

(58) Field of Classification Search
CPC ........ H04W 4/005–4/008; H04L 69/08; H04L 67/12–67/125; Y02B 60/30–60/50
USPC ............... 370/249, 328, 337, 338, 310, 466; 715/736; 709/230; 455/41.2, 411
See application file for complete search history.

(56) References Cited

U.S. PATENT DOCUMENTS

| | | | |
|---|---|---|---|
| 2008/0273486 A1* | 11/2008 | Pratt | ..................... H04L 12/403 370/328 |
| 2009/0010233 A1 | 1/2009 | Pratt, Jr. et al. | |
| 2010/0190442 A1* | 7/2010 | Citrano, III | ........ G05B 19/4185 455/41.2 |
| 2011/0110291 A1* | 5/2011 | Ishii | ....................... H04B 7/155 370/315 |

(Continued)

FOREIGN PATENT DOCUMENTS

| | | |
|---|---|---|
| EP | 2 582 103 A2 | 4/2013 |
| GB | 2 494 279 A | 3/2013 |

OTHER PUBLICATIONS

Search Report for Application No. GB1517037.6, dated Mar. 16, 2016.

*Primary Examiner* — Charles C Jiang
*Assistant Examiner* — Wali Butt
(74) *Attorney, Agent, or Firm* — Marshall, Gerstein & Borun LLP

(57) ABSTRACT

A plant wireless access point (PWAP) is disclosed that bridges communications between a field communicator and a plant automation network. The PWAP may facilitate provisioning of new plant devices into a plant automation wireless network using the field communicator, and may also facilitate the field communicator performing various functions regarding one or more plant devices connected to the plant automation network. The PWAP may allow a field communicator to access information from the plant automation network and/or from other sources via the plant automation network such as the Internet. In addition, the PWAP may determine a location of one or more field communicators relative to the PWAP and/or other devices connected to the plant automation network.

24 Claims, 4 Drawing Sheets

(56) References Cited

U.S. PATENT DOCUMENTS

2012/0230309 A1\* 9/2012 Junk ................. G05B 19/4186
370/338
2013/0070745 A1\* 3/2013 Nixon ..................... H04L 45/74
370/338

\* cited by examiner

MULTI-PROTOCOL DEVICE SUPPORTING WIRELESS PLANT PROTOCOLS

FIELD OF THE DISCLOSURE

The present disclosure relates generally to wireless access points and, more particularly, to wireless access points used in a process plant environment.

BACKGROUND

Process control systems, such as distributed or scalable process control systems like those used in utility power, water, oil refinement, wastewater or other processes, typically include one or more process controllers communicatively coupled to each other, to at least one host or operator workstation, and to one or more plant devices via analog, digital or combined analog/digital buses. The plant devices, which may be, for example, valves, valve positioners, switches, transmitters (e.g., temperature, pressure and flow rate sensors), perform functions within the process such as opening or closing valves and measuring process parameters.

A process controller typically receives signals indicative of process measurements made by the field devices (plant devices) and/or other information pertaining to the field devices, uses this information to implement a control routine, and generates control signals that are sent to the field devices to control the operation of the process. Information from the field devices and the process controller is typically made available via one or more applications that are executed by a workstation operator to perform a desired function with respect to the process, such as viewing the current state of a process, modifying the operation of a process, etc. A control loop typically refers to the overall control process including the measurement of process parameters and modifying the operation of the process parameters to effectuate one or more control processes, such as regulation of temperature, pressure, flow rate, etc. A process plant may have any suitable number of control loops based on an interaction between various field devices that is needed to adequately regulate a control process. As a result, the field devices may communicate with the process controller as well as with one another to ensure efficient process control.

Traditionally, control signals and/or the communications between field devices has been implemented using one or more wires or buses. More recently, wireless industrial automation protocols have been introduced to facilitate these communications. One such wireless industrial automation protocols used in the process control industry is the wireless Highway Addressable Remote Transmitter (HART) Communication Foundation protocol, referred to generally as the WirelessHART protocol. Generally speaking, the WirelessHART protocol utilizes a time synchronized, self-organizing, and self-healing mesh architecture, and supports operation in the 2.4 GHz Industrial, Scientific, & Medical (ISM) band using IEEE 802.15.4 standard radios. New field devices may be designed that are compatible with the WirelessHART protocol, or existing wired field devices may be retrofitted with an adapter to provide WirelessHART communication functionality.

Using WirelessHART protocols, control processes may be carried out wirelessly between the process controller and one or more field devices. However, some functions, such as firmware updates, software updates, calibration, configuration, etc., typically utilize physical, wired connections to the field devices, which may be performed with a field communicator that connect to a field device with a cable. Because the electronic connectors used to facilitate wired communications need to be protected from conditions in a plant environment, the electronic connectors are often protected by a cover, such as an end cap, for example, that may be removed to provide a user appropriate access for a wired connection.

Requiring a user to directly and physically connect to a field device presents several issues. First, the end cap or other covering may not be properly resealed upon completion of the task at hand, which may then expose the connector to the plant's harsh environmental conditions. Second, some plant processes may need to be stopped to provide access to a field device, since wired connections may require a user to be dangerously close to operating equipment.

Additionally, when connecting to the field device, the field communicator and the field device typically communicate using the same industrial automation protocol implemented by the field device, such as a wired HART protocol, for example. As a result, field communicators often use hardware and software components specifically designed for industrial automation protocol communications, thereby adding to their complexity and cost. Since field communicators typically only communicate using industrial automation protocols, the ability to access other data from the plant automation network is also limited.

Finally, although wireless field devices provide a more convenient means for facilitating process control by eliminating wires to carry control signals, initially setting up, or provisioning, new field devices into a preexisting plant network can be an arduous task. This is because most field devices are designed to perform plant related automation tasks, and therefore do not typically implement a user interface to allow a user to easily enter the requisite network authentication information.

As a result, maintaining the convenience of wireless plant control while eliminating the need to connect field communicators to field devices presents several challenges.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

SUMMARY OF THE DISCLOSURE

Figure 1:
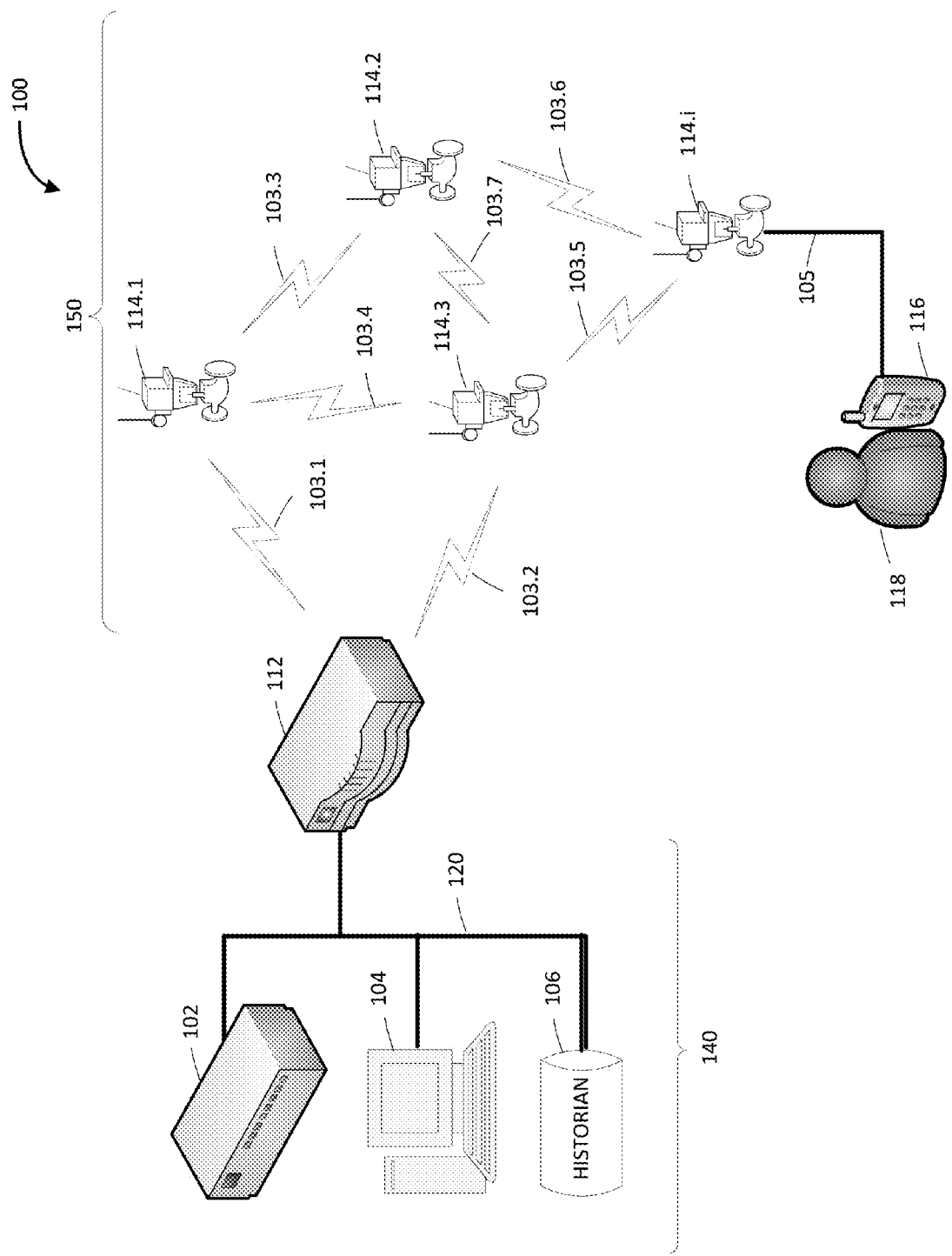
FIG. 1 is a block diagram illustrating a plant communications network 100 as is known in the art.

Methods, systems, apparatus, and non-transitory, computer-readable medium are disclosed to enable wireless communications between devices within a plant automation network, which may include one or more plant devices and one or more field communicators. In various embodiments, a plant wireless access point (PWAP) is described that bridges communications between a field communicator and a plant automation network. In accordance with various embodiments, the PWAP receives communications from one or more devices connected to the plant automation network and/or the field communicator in accordance with a respective wireless communications protocol for each device. In various embodiments, the PWAP may be configured to communicate with the field communicator using any suitable type of wireless communications, such as Wi-Fi, BLUETOOTH, radio frequency identification (RFID), near field communications (NFC), infrared communications, etc., while communicating with one or more devices within the plant automation network using an industrial plant automation communication protocol, such as WirelessHART and/or the International Society of Automation (ISA) 100.11a Standard.

Furthermore, various embodiments of the present disclosure describe a PWAP that enables provisioning of new plant devices into a plant automation wireless network using a field communicator. In various embodiments, the PWAP may also facilitate the field communicator performing various functions regarding one or more plant devices connected to the plant automation network, such as updating plant device firmware and/or software, performing calibration, diagnostics, loop checkouts, etc. In various embodiments, the PWAP may allow a field communicator to access information from the plant automation network and/or from other sources via the plant automation network such as the Internet.

In addition, various embodiments of the present disclosure describe a PWAP that is configured to determine a location of one or more field communicators relative to the PWAP and/or other devices connected to the plant automation network.

DETAILED DESCRIPTION

Although the following text sets forth a detailed description of numerous different aspects, it should be understood that the legal scope of the description is defined by the words of the claims set forth at the end of this patent. The detailed description is to be construed as exemplary only and does not describe every possible aspect since describing every possible aspect would be impractical, if not impossible. Numerous alternative aspects could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIG. 1 is a block diagram illustrating a plant communications network 100 as is known in the art. Plant communication network 100 includes a wired network 140 and wireless network 150, which are configured to communicate with one another through a wireless gateway 112. Wired network 140 includes a process controller 102, a workstation 104, and a historian 106. Wireless network 150 includes i number of field devices 114.1-114.i. Plant communications network 100 also includes a field communicator 116, which may be operated by a user 118.

The components that form wired network 140 may communicate with one another and with wireless gateway 112 using wired links 120. Similarly, the components that form wireless network 150 may communicate with one another and with wireless gateway 112 via wireless links 103.1-103.7. Field communicator 116 may communicate directly with any of field devices 114.1-114.i via a wired link 105.

As is known in the art, wired links 105 and 120 support a wired HART communications protocol, while wireless links 103.1-103.7 support a wireless HART protocol. Wireless gateway 112 may act as a bridge between the wired and wireless networks, such that components within wired network 140 may communicate with components within the wireless network 150, and vice-versa. Field communicator 116, however, is not part of wired network 140 or wireless network 150. Instead, field communicator 116 is typically connected to a respective field device 114 to form a direct connection only with the respective field device 114.

Process controller 102 may communicate with one or more of field devices 114.1-114.i using the wired HART protocol, which may be converted to a suitable wireless protocol via gateway 112. Examples of suitable wireless protocols may include the WirelessHART protocol, the ISA 100.11a Standard, etc. Gateway 112 may also convert wireless communications received from the one or more of field devices 114.1-114.i to the wired HART protocol, which is sent to process controller 102. Process controller 102 may include a processor, controller, memory, etc., to facilitate this functionality. Process controller 102 may implement and/or oversee one or more process control routines as part of one or more process control systems, which may include any suitable number of process control loops. Process controller 102 may communicate with one or more of field devices 114.1-114.i, workstation 104, and data historian 106 to facilitate one or more process control operations.

Information from the one or more field devices 114.1-114.i and process controller 102 is typically made available via one or more applications that are executed by a workstation operator at workstation 104. A workstation operator may use workstation 104 to perform a desired function with respect to one or more of the control processes. Using workstation 104, an operator may view the current state of a process, modify the operation of a process, etc. In a typical plant, an engineer may define and configure the process control strategy using a configuration system that runs on workstation 104. Workstation 104 may be implemented as a laptop, a desktop computer, etc. Workstation 104 may communicate with data historian 106 and process controller 102 using wired communication protocols different from the HART protocol, such as Ethernet, for example. However, doing so requires separate sets of wiring to be implemented in link 120, such as separate dedicated Ethernet and HART cabling, for example.

Data historian 106 may function as a data storage unit having memory and suitable hardware for storing data. Data historian 106 may be separate from workstation 104 (as illustrated in FIG. 1) or integrated as a part of workstations 104. Data historian 106 typically stores logs or a history of process data. In conjunction with workstation 104, an operator may use a software application to view recorded trends and historical information about plant processes for future reference.

Field devices 114.1-114.*i* are typically implemented as devices such as sensors, valves, transmitters, positioners, etc. In the typical plant communication network 100 illustrated in FIG. 1, field devices 114.1-114.*i* represent one or more WirelessHART and/or ISA 100.11a compatible field devices. Since the WirelessHART protocol supports self-organizing mesh networks, one or more field devices 114.1-114.*i* may communicate with each other via one or more respective wireless links 103.3-103.7 using a self-organizing mesh network in accordance with the WirelessHART protocol. In addition, one or more of field devices 114.1-114.*i* may communicate with the wireless gateway 112, as indicated by wireless links 103.1-103.2.

However, some operations typically require the field communicator 116 to implement wired link 105 to connect to a field device 114. As previously discussed in the background section, field communicator 116 may need to implement a wired connection to a field device 114 to perform tasks such as software and/or firmware updating, calibration, and manual configuration. The requirement to physically connect to each individual field device is time consuming and requires that the user remove caps or other physical protections to access each individual field device. Furthermore, field communicator 116 is typically only able to access basic data from each separately connected field device 114. Field communicator 116 cannot access data from wired network 140 via the connection to a field device 114 via wired link 105, since field communicators typically have limited and specialized functionality. Since field communicator 116 typically communicates with a field device 114 using a wired HART communication protocol, field communicator 116 is typically implemented as a specialized device, adding to its expense and limiting its availability.

Figure 2:
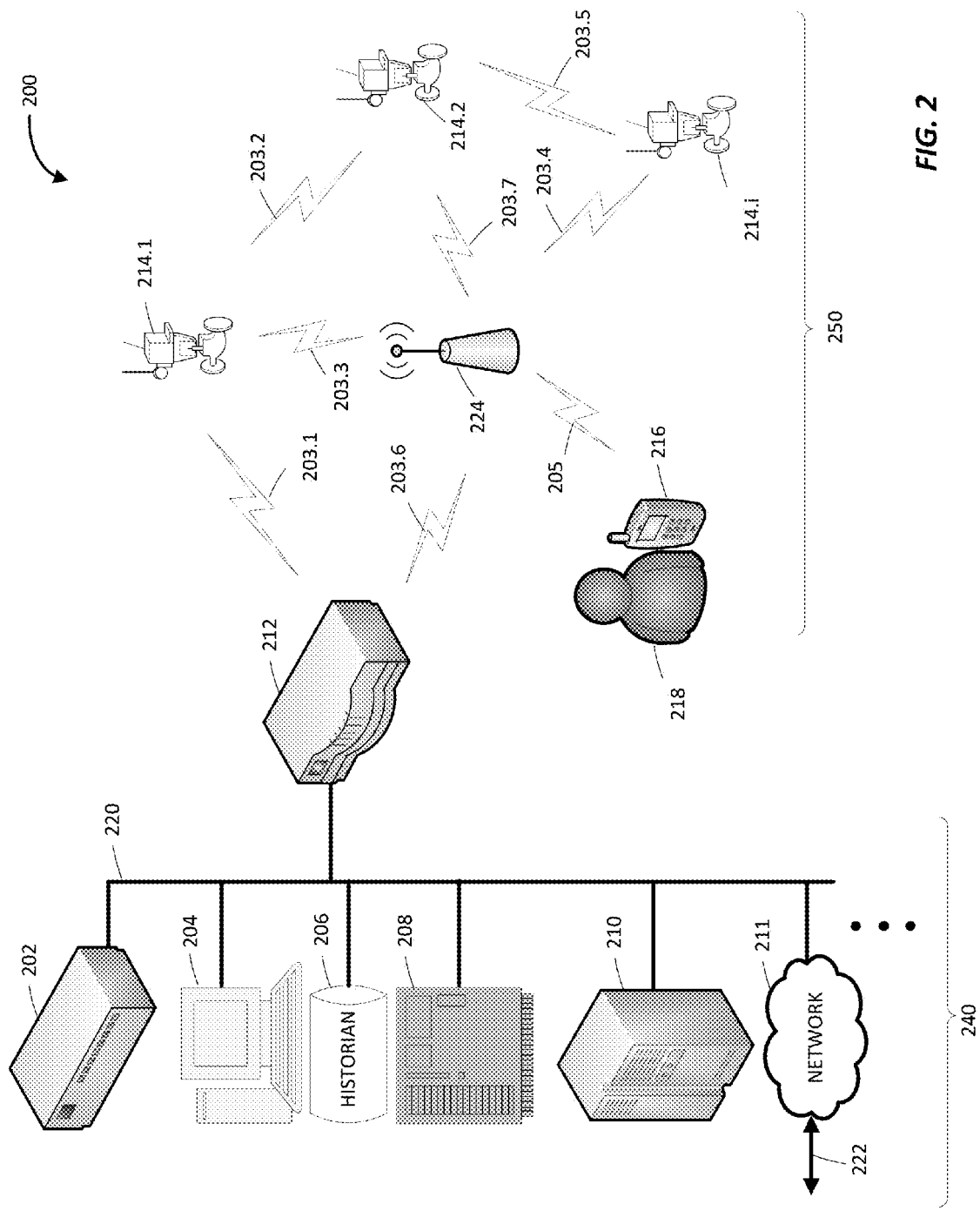
FIG. 2 is an exemplary block diagram illustrating a plant communications network 200 in accordance with an embodiment.

FIG. 2 is an exemplary block diagram illustrating a plant communications network 200 in accordance with an embodiment. Plant communication network 200 includes a wired network 240 and wireless network 250, which are configured to communicate with one another through a wireless gateway 212. Plant communication network 200 also includes a plant wireless access point (PWAP) 224, which facilitates wireless communications between field communicator 216 (operated by user 218) and wired network 240 via wireless gateway 212. PWAP also facilitates wireless communications between field communicator 216 and one or more field devices 214.1-214.*i*, which may or may not utilize wireless gateway 212 to communicate with wired network 240.

Wired network 240 may include a process controller 202, a workstation 204, a historian 206, an asset management and control system 208, a legacy process control system 210, and a network 211. Wireless network 250 includes i number of field devices 214.1-214.*i*, PWAP 224, and may include field communicator 216. Process controller 202, workstation 204, historian 206, and field devices 214.1-214.*i* may have a substantially similar architecture and perform substantially the same functions as process controller 102, workstation 104, data historian 106, and field devices 114.1-114.*i*, as previously discussed with reference to FIG. 1. Therefore, only differences between these components will be further described.

In some embodiments, process controller 202 may facilitate process control functions in a plant or other suitable type of environment. In other embodiments, process controller 202 may not be present. This could be the case when, for example, a wireless network is utilized for monitoring functions only, and process control is not needed or desired. As will be further discussed below, one or more functions performed by process controller 202 may alternatively be performed by other components of wired network 240, such as one or more of asset management and control system 208, legacy process control system 210, etc. As a result, embodiments in which process controller 202 is not present, one or more other components of wired network 240 may alternatively facilitate communication functions between PWAP 224, gateway 212, field communicator 216, and/or field devices 214.

Asset management and control system 208 may be configured to execute one or more software applications, such the Asset Management System (AMS) application and/or the AMS Device Manager sold by Fisher-Rosemount Systems, Inc. In accordance with various embodiments, any suitable device connected to wired network 140 may communicate with asset management and control system 208 to execute these applications. For example, an operator may use workstation 204 to execute a suitable application stored on asset management and control system 208 to perform maintenance and/or monitoring activities. Furthermore, asset management and control system 208 may be configured to connect to process controller 202 via wired link 220 and receive process control parameters. Asset management and control system 208 may utilize this information in conjunction with any suitable asset management system.

To provide another example, asset management and control system 208 may be configured to connect to one or more field devices 214.1-214.*i* via gateway 212 and/or via a combination of wireless gateway 212 and PWAP 224. Using these connections, asset management and control system 208 may communicate with and, in some instances, collect data related to the operating status, compare the configurations of received field devices 214 with the configurations of ordered field devices, reconfigure, and/or perform other maintenance activities on one or more field devices 214.1-214.*i* upon receiving a request from an operator via workstation 204, for example.

In various embodiments, legacy process control system 210 may be configured to perform any suitable control process tasks similar to those performed by process controller 202 for one or more of field devices 214.1-214.*i*. Legacy process control system 210 may include, for example, third-party process controllers and/or process controllers that have been retrofit, migrated, and/or reprogrammed to communicate with other devices via wired network 240 and/or wireless network 250. In various embodiments, legacy process control system 210 may directly perform control process techniques on one or more field devices 214.1-214.*i* or may communicate with process controller 202 such that process controller 202 and/or legacy process control system 210 performs process control operations. In other words, the disclosed systems and techniques may be implemented "on top of" legacy process control system 210.

Network 211 may include any appropriate combination of wired and/or wireless communication networks. For example, network 211 may include any combination of a local area network (LAN), metropolitan area network (MAN), wide area network (WAN), public switched telephone networks (PSTN), and may facilitate a connection to the Internet or other networks via link 222. To provide further examples, network 211 may include wired telephone and cable hardware, satellite, cellular phone communication networks, etc.

Although network 211 and link 222 are illustrated in FIG. 2 as single elements, those of ordinary skill in the relevant art(s) will appreciate that network 211 may include a collection or aggregation of several networks, which may be the same or varying types of wired and/or wireless networks. For example, a connection to the internet via wired links 220 may be facilitated by several firewalls, routers, domain name servers (DNS), sub-networks, wired links, wireless links, etc. To provide another example, a process plant may have several wired networks 240 tied together and in communication with one another across several network links. For brevity, any such suitable collection of network topologies is illustrated in FIG. 2 as network 211 and link 222.

Although wired network 240 is shown in FIG. 2 as having a few connected networks and/or devices via wired link 220, those of ordinary skill in the relevant art(s) will appreciate that plant communication network 200 may include a wired network 240 having any suitable number of connected networks and/or devices based on the process control requirements of a particular process plant.

In various embodiments, gateway 212 may be configured to convert communications between wired industrial automation protocols and wireless industrial automation protocols. For example, gateway 212 may be configured to forward packets received from one or more devices connected to wired network 240 to one or more devices connected to wireless network 250, and vice-versa. In this way, gateway 212 may function as a routing device. For example, in various embodiments, field devices 214.1-214.i may be configured to send and receive data packets in accordance with a suitable wireless industrial automation protocol, such as WirelessHART packets and/or ISA 100.11a packets, for example. Gateway 212 may be configured to route packets received wirelessly from field devices 214.1-214.i via a wireless link, such as wireless link 203.1, for example, to one or more devices connected to wired network 240 via a wired link, such as wired link 220, for example. To provide another example, gateway 212 may be configured to route packets received from devices connected to wired network 240 via wired link 220 to field devices 214.1-214.i via one or more wireless links 203.

Gateway 212 may act as a consolidated connection to one or more plant networks and/or to wired network 240. Accordingly, gateway 212 may be implemented with any suitable number of hardware and/or software firewalls and may facilitate communications between devices connected to wired network 240. For example, gateway 212 may act as a router and/or arbitrator to forward data packets between one or more components connected to wired network 240. Furthermore, in various embodiments, gateway 212 may be configured to implement routing tables to determine which network device (which may be a part of wired network 240 or wireless network 250) to forward packets.

In various embodiments, gateway 212 may provide host applications access to one or more network devices, which may be a part of wired network 240 or wireless network 250. Gateway 212 may convert from one protocol to another, act as a bridge between two or more networks that use the same protocol, or convert commands and data from one format to another. In embodiments in which a WirelessHART network is implemented by wireless network 250, gateway 212 may provide a source for the synchronized clock used to generate time slots and superframes in accordance with the WirelessHART protocol. As will be appreciated by those of ordinary skill in the relevant art(s), plant networks may implement more than one gateway, but only a single gateway is shown in FIG. 2 for purposes of brevity. However, when multiple gateways are utilized, embodiments include utilizing these multiple gateways to improve the effective throughput and reliability of plant communications network 200 by providing additional bandwidth for data transfer between wireless network 250 and wired network 240. In multiple gateway embodiments, one of the gateways may dynamically request bandwidth from a network manager according to bandwidth needs. A network manager is not shown in FIG. 2 for purposes of brevity.

In various embodiments, gateway 212 may utilize any suitable communication protocol to facilitate communications between wired network 240 and wireless network 250. For example, gateway 212 may implement Ethernet and serial communication protocols to communicate with one or more devices connected to wired network 240, while implementing WirelessHART and/or ISA 100.11a communication protocols to communicate with field devices 214.1-214.i.

PWAP 224 may be configured to facilitate communications between one or more components of plant communications network 200. As will be appreciated by those of ordinary skill in the relevant art(s), PWAP 224 may implement any suitable number of processors, receivers, transmitters, transceivers, etc., to facilitate the various functions as described throughout this disclosure. Additional details regarding the implementation of PWAP 224 is further discussed with reference to FIG. 3.

For example, PWAP 224 may facilitate communications between field communicator 216 and one or more field devices 214.1-214.i, as represented in FIG. 2 by wireless links 205 and 203.7, for example. In accordance with such embodiments, PWAP 224 may receive data from field communicator 216 in accordance with any suitable wireless communication protocol. In various embodiments, PWAP 224 may be configured to receive communications from field communicator 216 in accordance with any suitable wireless communication protocol other than the WirelessHART and/or ISA 100.11a communications protocols, such as wireless local area network (WLAN) communications protocol, a personal area network (PAN) communications protocol (e.g. BLUETOOTH), a Wi-Fi direct communications protocol, an RFID communications protocol, an NFC communications protocol, an infrared communications protocol, etc.

In an embodiment, the second wireless communications protocol may include the WirelessHART communications protocol or the ISA 100.11a communications protocol. In accordance with such embodiments, PWAP 224 may be configured to perform these communication functions bidirectionally. That is, PWAP 224 may receive data from one or more field devices 214.1-214.i in accordance with a first wireless communication protocol (e.g., WirelessHART or ISA 100.11a), decode the data in accordance with the first wireless communication protocol, re-encode the data in accordance with a second, different, wireless communications protocol (in this case, e.g., WLAN, BLUETOOTH, etc.) and transmit the data to field communication 216 in accordance with the second wireless communication protocol.

In accordance with such embodiments, PWAP 224 may be configured to receive data from field communicator 216, to decode this data in accordance with a first wireless communication protocol, to re-encode the data in accordance with a second wireless communication protocol, and to transmit the re-encoded data to one or more field devices 214.1-214.*i* in accordance with the second wireless communications protocol. For example, field communicator 216 may be configured to embed and/or encapsulate data such as one or more instructions, commands, etc., inside another communication protocol data unit, such that the data is part of a Wi-Fi or BLUETOOTH data unit, for example. This data may include, for example, one or more HART commands, ISA 100.11a commands, etc.

PWAP 224 may receive data from field communicator 216 in accordance with the first communications protocol (e.g., Wi-Fi, BLUETOOTH, etc.) and decode the data unit to retrieve the embedded data. PWAP 224 may then re-encode the retrieved data as part of the second communications protocol, such as WirelessHART, for example, and transmit the data to one or more field devices 214.1-214.*i* in accordance with the second wireless communications protocol (e.g., the WirelessHART communications protocol).

Additionally or alternatively, PWAP 224 may facilitate communications between field communicator 216 and one or more field devices 214.1-214.*i* via a wired network 240, as represented in FIG. 2 by wireless links 205, 203.6, and 203.7, for example. In accordance with such embodiments, PWAP 224 may receive data from field communicator 216, to decode this data in accordance with a first wireless communication protocol, to re-encode the data in accordance with a second wireless communication protocol, to transmit the re-encoded data to gateway 212, to receive data from one or more components of wired network 240 via gateway 212, and to transmit the data to one or more field devices 214.1-214.*i* in accordance with the second wireless communications protocol.

For example, as previously discussed, field communicator 216 may be configured to embed and/or encapsulate data such as one or more instructions, commands, etc., inside another communication protocol data unit, such that the data is part of a Wi-Fi or BLUETOOTH data unit, for example. This data may be intended for one or more field devices 214.1-214.*i*, or, as discussed in this embodiment, for one or more components of wired network 240. Again, this data may include, for example, one or more HART commands, ISA 100.11a commands, etc.

In embodiments in which data is intended to be sent to one or more components of wired network 240 via PWAP 224, PWAP 224 may receive data from field communicator 216 in accordance with the first communications protocol (e.g., Wi-Fi, BLUETOOTH, etc.) and decode the data unit to retrieve the embedded data. PWAP 224 may then re-encode the retrieved data as part of the second communications protocol, such as WirelessHART, for example, and transmit the data to gateway 212, which in turn converts the wireless communications protocol to a wired communications protocol to forward the data to one or more components of wired network 240 via wired link 220.

Upon receiving the data via wired link 220, one or more components of wired network 240 may respond with the appropriate commands by sending data back to gateway 212 via wired link 220. Gateway 212 may then convert the data from the wired communication protocol received via wired link 220 to a suitable wireless communications protocol, and transmit the data received via wired link 220 to one or more of PWAP 224 and/or or more field devices 214.1-214.*i* in accordance with the second wireless communications protocol (e.g., the WirelessHART communications protocol). If gateway 212 transmits the data to PWAP 224 as opposed to one or more field devices 214.1-214.*i*, PWAP 224 may convert, forward, and/or otherwise route the data to the appropriate field device 214.

In this way, PWAP 224 may facilitate communications between field communicator 216 and one or more field devices 214.1-214.*i* either directly or indirectly (e.g., via wired network 240 and gateway 212). As will be appreciated by those of ordinary skill in the relevant art(s), PWAP 224 may implement direct and/or indirect communications between field communicator 216 and one or more field devices 214.1-214.*i* based on any suitable number of factors such as network bandwidth optimization, desired speed, performance requirements of plant communications network 200, available processing resources available to PWAP 224, etc. For example, more complex or time consuming operations may be offloaded to process controller 202 by PWAP 224 when received from field communicator 216 using indirect communications.

Thus, embodiments include PWAP 224 acting as a bridge to facilitate communications between field communicator 216 and one or more communication devices 214.1-214.*i* using one type of wireless communication protocol for communications between PWAP 224 and field communicator 216 and another type of wireless communications protocol for communications between PWAP 224 and one or more communication devices 214.1-214.*i*. Because PWAP 224 may be configured to maintain a communications with one or more communication devices 214.1-214.*i* in accordance with a WirelessHART and/or ISA 100.11a communications protocol, user 218 may use field communicator 216 to perform the same functions (e.g., configuration, calibration, software and/or firmware updating, etc.) that would otherwise require direct wired access to the individual field devices 214.1-214.*i* by communicating with PWAP 224.

Because field communicator 216 may implement more common communication protocols, such as wireless LAN and/or BLUETOOTH, for example, this advantageously allows field communicator 216 to be implemented as a device that already utilizes the hardware for these types of communication protocols. For example, in various embodiments, field communicator 216 may be implemented as a smartphone, a laptop, a tablet computer, or any suitable device that may be configured to perform this functionality. Since commands may be sent from field communicator 216 to one or more field devices 214.1-214.*i* via communications with PWAP 224, field communicator 216 may be implemented as a device that uses one or more software applications, programs, etc., in conjunction with a device's existing implemented hardware to accomplish the same functions that would otherwise require a field communicator device using more specialized hardware.

To provide another example, PWAP 224 may facilitate communications between one or more field devices 214.1-214.*i*, as represented in FIG. 2 by wireless links 203.3 and 203.7, for example. In accordance with such embodiments, PWAP 224 may receive data from one or more field devices 214.1-214.*i* in accordance with a wireless communication protocol, such as WirelessHART and/or ISA 100.11a communication protocols, for example, and transmit this data to one or more field devices 214.1-214.*i* using the same wireless communication protocol. In this way, embodiments include PWAP 224 being configured to act as a wireless relay device, allowing plant personnel to strategically place several PWAPs 224 throughout a plant floor to ensure that communications between gateway 212 and each of field devices 214.1-214.*i* are maintained. In an embodiment, PWAP 224 may be configured to implement a routing table system in accordance with a suitable communications protocol to ensure that data is delivered to one or more appropriate field devices 214.1-214.i.

To provide yet another example, PWAP 224 may facilitate communications between field communicator 216 and one or more components that are part of wired network 240, as represented in FIG. 2 by wireless links 205 and 203.6, for example. Again, embodiments include PWAP 224 being configured to convert one or more communication protocols to facilitate communications between field communicator 216 and one or more field devices 214.1-214.i. Similarly, embodiments include PWAP 224 being configured to facilitate communications between field communicator 216 and one or more components associated with wired network 240 via gateway 212. For example, field communicator 216 may receive data from one or more of process controller 202, workstation 204, historian 206, asset management and control system 208, legacy process control system 210, and/or network 211 via PWAP 224 and gateway 212.

Gateway 212 may be configured to provide communications between wired network 240 and wireless network 250 using wired and wireless communication protocols, respectively. As a result, PWAP 224 may advantageously facilitate communications between wired network 240 and field communicator 216 by providing protocol conversion between communications already converted by gateway 212 from a wired HART communications protocol to a WirelessHART communications protocol. That is, PWAP 224 may convert already converted WirelessHART communication protocol data received via wireless link 203.6 from gateway 212 to an applicable communication protocol implemented by field communicator 216 via wireless link 205.

In this way, field communicator 216 may communicate with components of both wired network 240 and wireless network 250 using the same communication protocol from the perspective of field communicator 216. By communicating with field devices 214, field communicator 216 may allow a user 218 to access data such as configuration data, calibration data, and diagnostic data, for example, that is applicable to one or more field devices 214.1-214.i. Since WirelessHART communication protocols include a command set that enables a field device 214 to update its software and/or firmware remotely, various embodiments include field communicator 216 utilizing PWAP 224 to send applicable commands to update the software and/or firmware of one or more field devices 214.1-214.i.

In addition, by utilizing PWAP 224 to communicate with components connected to wired network 240, field communicator 216 may access a plethora of valuable information besides data received from one or more field devices 214.1-214.i. For example, in various embodiments, field communicator 216 may download data stored on workstation 204 or download data from an Internet connection via network 211, for example. Some examples of information that may be downloaded in this way may include documentation, videos, or help content regarding the configuration and operation of one or more devices within plant communications network 200, such as field devices 214.1-214.i or any other device based on a particular plants specific need.

To provide additional examples, field communicator 216 may download information stored on asset management and control system 208, such as asset and process histories, current process conditions, calibration information, audit trail data, etc. To provide yet another example, field communicator 216 may communicate with process controller 202 via PWAP 224 to perform tasks such as loop checkouts in conjunction with the overall plant process control system.

Since field communicator 216 may be implemented as a non-specialized device, embodiments include field communicator 216 communicating with PWAP 224 to provision new devices 214, or additional PWAPs, onto wireless network 250. That is, typical field communicators have limited functionality, as previously discussed, and as a result, traditional plant networks rely on an operator provisioning new wireless devices from a wired device, such as a workstation, for example. Furthermore, some wireless communication protocols, such as WirelessHART, for example, do not support temporary provisioning of new wireless devices onto an existing WirelessHART network. Without provisioning a field communicator onto an existing wireless network, conventional plant networks limit the connections between field communicators and field devices to local, hardwired connections.

Thus, to perform provisioning, conventional plant networks may require an operator to utilize workstation 104, which may have an appropriate graphical user interface, to provision a new field device to enroll the new field device into wireless network 150. The provisioning device typically includes entering the appropriate network authentication information at workstation 104, which may include a media access controller (MAC) address of the new field device 114, a network password, or other information to enable the new field device to communicate with a wireless gateway, and thus enable communications between the new field device and wired network 140.

Since PWAP 224 may be configured to recognize, receive, and transmit data in accordance with several communication protocols, provisioning functionality (e.g., temporary provisioning of new field devices 114) may be utilized by another device that is in communications with PWAP 224, such as field communicator 216, for example. Field communicator 216 may implement a suitable graphical user interface (GUI) or other type of user interface for performing plant process tasks associated with field devices 214. As a result, user 218 may use field communicator 216 for provisioning new field devices, since field communicator 216 is configured to communicate with PWAP 224. In this way, PWAP 224 facilitates the provisioning of new field devices by a user 218 from the convenience of the plant floor while user 218 may be performing other tasks, thereby improving productivity by not requiring user 218 to find a workstation to do so.

In various embodiments, PWAP 224 may determine a location of field communicator 216 that may be viewed by plant personal at other workstations, such as workstation 204, for example. This may address safety considerations by allowing plant personnel to track user 218 and to preemptively shutdown or otherwise monitor equipment that is close to user 218 to address safety concerns.

For example, embodiments include one or more workstations, such as workstation 204, for example, having one or more installed applications that may determine a location of PWAP 224 (including any other additional PWAPs) and/or field devices 214.1-214.i. Additionally, the application may determine which field devices 214 are connected to PWAP 224 (and other PWAPs) as well as a specific PWAP that field communicator 216 is connected to at a given time. User 218 may use a workstation running such an application to determine a location of each field device 214 and PWAP 224 within a plant based on a plant bitmap.

In an embodiment, this application may include a WirelessHART SNAP-ON planning application, developed by Emerson Process Management, Inc. Using information based on which PWAP a field communicator 216 is presently connected to, the physical location of PWAP 224 within the plant, and a wireless range of the PWAP, a location of field communicator 216 may be narrowed to a radius corresponding to the wireless range of the PWAP and approximately centered about the PWAP (assuming an near omni-directional wireless coverage area) based on this information. The accuracy of this estimation may be improved upon for embodiments in which PWAP 224 communicates with field communicator 216 using a communication protocol having a smaller communications range, such as BLUETOOTH, for example, which has a typical maximum communication range of about 30 feet.

To provide another example of determining a location of field communicator 216, PWAP 224 may determine location information based on a suitable IEEE 802.11 communication standard used for communications between PWAP 224 and field communicator 216. As will be appreciated by those of ordinary skill in the relevant art(s), IEEE 802.11n and 802.11ac standards use multiple-input, multiple-output (MIMO) antenna beamsteering techniques. Because MIMO beamsteering techniques determine direction of other devices for beamsteering purposes, this information may be coupled with wireless ranging information to locate field communicator 216 with reference to the location of PWAP 224.

Again, as will be appreciated by those of ordinary skill in the relevant art(s), ranging information between IEEE 802.11 standards may include time of arrival (ToA) and time of departure (ToD) timestamping and signal attenuation calculations to determine a range between PWAP 224 and field communicator 216. Various embodiments include PWAP 224 reporting the determined location of field communicator 216 to a suitable network device, such as workstation 204, for example, so this location may be viewed by the appropriate plant personnel.

To provide yet another example of determining a location of field communicator 216, although only a single PWAP 224 is illustrated in FIG. 2, embodiments of plant network 200 may include any suitable number of PWAPs. In accordance with an embodiment, a user of an appropriate workstation, such as workstation 204, for example, may determine a location of field communicator 216 based on the location of multiple PWAPs that are connected to field communicator 216. In various embodiments, any of the aforementioned examples may be combined to provide a location of field communicator 216. For example, using the location reported by several PWAPs in communication with field communicator 216 in accordance with 802.11 standards as previously discussed, workstation 204 may use an application that implements a suitable triangulation calculation to improve upon the accuracy of the location of field communicator 216 otherwise determined from a single PWAP.

Figure 3:
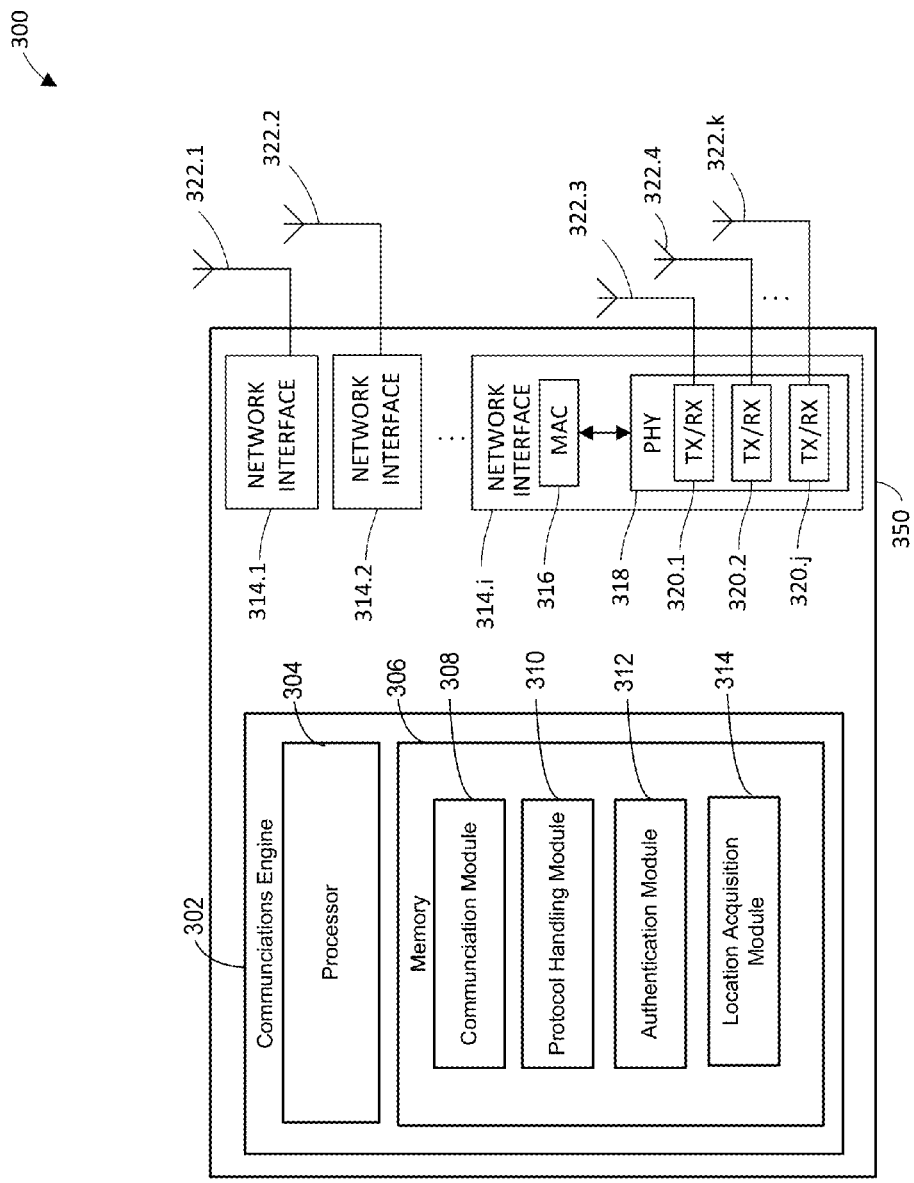
FIG. 3 is an exemplary block diagram illustrating a plant wireless access point (PWAP) 300 in accordance with an embodiment.

FIG. 3 is an exemplary block diagram illustrating a plant wireless access point (PWAP) 300 in accordance with an embodiment. PWAP 300 includes a communications engine 302, which includes a host processor 304 and a memory 306, i number of network interfaces 314.1-314.i, and k number of antennas 322.1-322.k. In an embodiment, PWAP 300 is an exemplary implementation of PWAP 224, as shown in FIG. 2.

Host processor 304 may be configured to communicate with i number of network interfaces 314.1-314.i. Each of network interfaces 314.1-314.i may include a medium access control (MAC) unit 316 and a physical layer (PHY) unit 318. PHY unit 318 may include j number of transceivers 320.1-320.j. Transceivers 320 may be coupled to k number of respective antennas 322.1-322.k. As will be appreciated by those of ordinary skill in the relevant art(s), although three transceivers 320.1-320.j and three antennas 322.3-322.k are illustrated in FIG. 3, various embodiments of PWAP 300 include any suitable number (e.g., 1, 2, 4, 5, etc.) of transceivers 320 and any suitable number (e.g., 1, 2, 4, 5, etc.) of antennas 322. Further in accordance with various embodiments, any number of transceivers 320 can be coupled to any number of antennas 322, such that one or more antennas are shared between suitable transceivers, and vice versa.

In an embodiment, each of network interfaces 314.1-314.i has a similar structure, with a corresponding MAC unit, PHY unit, one or more transceivers and one or more antennas. In some embodiments, one or more antennas are shared among two or more of network interfaces 314.1-314.i. In some embodiments, network interfaces 314.1-314.i correspond to different radio access technologies (RATs). Further in accordance with such embodiments, network interface 314.1 could correspond to a wireless industrial automation communication protocol, such as WirelessHART or ISA 100.11a, for example, while network interface 314.2 corresponds to another wireless communication protocol, such as WLAN, BLUETOOTH, etc.

In various embodiments, PWAP 300 may transmit and receive communications in accordance with any number of suitable communication protocols via one or more network interfaces 314.1-314.i, such as WirelessHART communication protocols, ISA 100.11a communication protocols, cellular protocols, wireless local area network (WLAN) communication protocols specified by one or more wireless IEEE standards, BLUETOOTH®, WiMAX, etc. Examples of suitable wireless IEEE standards include 802.11a, 802.11, g, 802.11n, 802.11ac, 802.11ad, 802.11af, 802.11v, and/or 802.11ah standards.

In accordance with such embodiments, PWAP 300 may be configured to receive data via one of network interfaces 314, such as network interface 314.1, for example, in accordance with a first type of communication protocol. This data may, in turn, be decoded by communications engine 302 in accordance with the first communication protocol. Further in accordance with such embodiments, PWAP 300 may be configured to encode the data that was previously decoded in accordance with a second communications protocol. PWAP 300 may be configured to then transmit this encoded data from another network interface 314, such as network interface 314.2, for example.

Communications engine 302, in conjunction with one or more of network interfaces 314.1-314.i, may be configured to enable data communications between PWAP 300 and one or more other wireless communication devices. For example, various embodiments include communications engine 302 being configured to facilitate communications between PWAP 300 and one or more wireless field devices (e.g., field devices 214.1-214.i, as shown in FIG. 2), gateways (e.g., gateway 212, as shown in FIG. 2), wired network components (e.g., components connected to wired network 240, as shown in FIG. 2) and/or field communicators (e.g., field communicator 216, as shown in FIG. 2).

In an embodiment, communications engine 302 may be configured to process data received from one or more one of network interfaces 314 and to decode this data in accordance with an appropriate communications protocol, such as WLAN, BLUETOOTH, etc., for example. As will be appreciated by those of ordinary skill in the relevant art(s), communications engine 302 and/or a one or more of network interfaces 314.1-314.i may include any suitable number of demodulators, local oscillators, baseband processors, mixers, filters, amplifiers, etc., to facilitate this functionality.

Similarly, embodiments include communications engine 302 being configured to process data to be transmitted via one or more one of network interfaces 314 and to encode this data in accordance with an appropriate communications protocol, such as WirelessHART or ISA 100.11a communications protocols, for example. Again, as will be appreciated by those of ordinary skill in the relevant art(s), communications engine 302 and/or a one or more of network interfaces **314.1-314.*i*** may include any suitable number of modulators, local oscillators, baseband processors, mixers, filters, amplifiers, etc., to facilitate this functionality.

In accordance with various embodiments, communications engine 302 may receive data in accordance with one communications protocol and transmit this data in accordance with another communications protocol.

Although illustrated as a single engine in FIG. 3, in various embodiments, communications engine 302 may consist of any number or group of one or more communications engines. In accordance with such embodiments, each communications engine may include one or more processors and be configured to operate independently of the other communications engines. Communications engines operating as a group may process requests from one or more other wireless communication devices individually (e.g., based on their availability) and/or concurrently (e.g., parallel processing). Communications engines operating as a group may process requests from wireless communication devices in a prioritized and/or distributed manner. For example, an operation associated with processing a request may be performed on one communications engine while another operation associated with processing the same request (or a different request) is performed on another communications engine.

Processor 304 may be configured to communicate with memory 306 to store to and read data from memory 306. In accordance with various embodiments, memory 306 is a computer-readable non-transitory storage device that may include any combination of volatile (e.g., a random access memory (RAM), or a non-volatile memory (e.g., battery-backed RAM, FLASH, etc.). Memory 306 may be configured to store instructions executable on processor 304. These instructions may include machine readable instructions that, when executed by processor 304, cause processor 304 to perform various acts.

Communication module 308 is a portion of memory 306 configured to store instructions, that when executed by processor 304, cause processor 304 to receive data from one or more of network interfaces **314.1-314.*i* in accordance with a respective communications protocol, to decode this data, to encode the decoded data in accordance with a second communications protocol for transmission via one or more of network interfaces 314.1-314.*i*, and to cause one or more of network interfaces 314.1-314.*i*** to transmit the encoded data.

Protocol handling module 310 is a portion of memory 306 configured to store instructions, that when executed by processor 304, cause processor 304 to determine the type of communications protocol corresponding to the received data. For example, protocol handling module 310 may include instructions for recognizing, decoding, and/or encoding data in accordance with a plurality of various communication protocols. In various embodiments, processor 304 may utilize instructions stored in both communications module 308 and protocol handling module 310 to perform these functions. To provide an illustrative example, protocol handling module 310 may include instructions regarding packet sizes, header preambles and/or header lengths, frame and/or packet rates, coding rates, modulation and/or demodulation schemes, and any other suitable information for processing data to be received or transmitted in accordance with any suitable wireless communications protocol.

In various embodiments, protocol handling module 310 may include instructions that enable processor 304 to recognize data in accordance with a particular wireless communication device. As will be appreciated by those of ordinary skill in the relevant art(s), protocol handling module 310 may include instructions to enable processor 304 to determine an identity and/or address of one or more wireless communication devices such that the encoded data includes the appropriate addressable information to be received by an intended recipient communication device.

For example, protocol handling module 310 may include instructions that enable processor 304 to recognize a target device (e.g., field devices, wired network components, etc.) from communications received from a field communicator, such as field communicator 216, for example, as shown in FIG. 2. Instructions stored in protocol handling module 310 may enable processor 304 to decode data transmitted by a field communicator in accordance with a recognized communications protocol, to determine a target recipient device, and to transmit the data re-encoded as part of another communications protocol to that intended target recipient device. Protocol handling module 310 may include instructions representative of address tables, routing tables, or any other suitable routing system to enable processor 304 to receive data from and to transmit data to the intended devices.

Authentication module 312 may include instructions that enable processor 304 to provision and/or authenticate new devices into an existing wireless network. For example, as previously discussed with reference to FIG. 2, a user may utilize another device, such as a field communicator, for example, to provision a new device, such as a new field device, for example, into an existing wireless network. In various embodiments, instructions stored in authentication module 312 may enable processor 304 to determine whether device credentials entered by a user match those of the wireless network. To provide an illustrative example, a user may utilize a field communicator to first access PWAP 300 to request that a new field device be provisioned. Processor 304 may access instructions stored at authentication module 312 to determine the appropriate secure network authentication credentials, which may be encrypted or otherwise stored in a secured part of memory 306. If the credentials match, then processor 304 may cause PWAP 300 to communicate with the new field device to be provisioned. As will be appreciated by those of ordinary skill in the relevant art(s), WirelessHART communications protocol includes a handshaking authentication procedure to verify newly added field devices, which may be part of the instructions stored in authentication module 314.

Embodiments include PWAP 300 utilizing this handshaking procedure but initiating the procedure from another device such as a field communicator. In this way, PWAP 300 may advantageously perform a provisioning procedure using known provisioning communication protocol methods, such as those defined in the WirelessHART communications protocol, for example, while receiving the instructions and authentication information from a field communicator in accordance with another wireless communications protocol, such as WLAN or BLUEOOTH, for example. Because PWAP 300 may communicate using two or more communication protocols, this allows a user to utilize a wireless field communicator as opposed to a wired workstation to provision a new field device.

Location acquisition module 314 may include instructions that enable processor 304 to determine a location of one or more other PWAPs, field communicators, and/or field devices. As previously discussed with reference to FIG. 2, instructions included in location acquisition module 314 may enable processor 304 to perform ranging and directional analysis in accordance with one or more wireless standards or any suitable technique. For example, location acquisition module 314 may enable processor 304 to utilize ToA and ToD timestamps when PWAP 300 is communicating with one or more field communicators in accordance with an 802.11 series of wireless IEEE communication protocols such 802.11n, 802.11ac, etc.

To provide another example, instructions included in location acquisition module 314 may enable processor 204 to utilize MIMO beamforming information to determine a direction between PWAP 300 and a field communicator based on the direction of a steered beam. The direction and/or ranging information calculated by processor 304 may be stored in memory 306, transmitted to a networked device (e.g., a workstation). In this way, PWAP 300 may provide plant personnel with a means to locate a user operating a respective field communicator based on the acquired location of a field communicator operated by the user.

Figure 4:
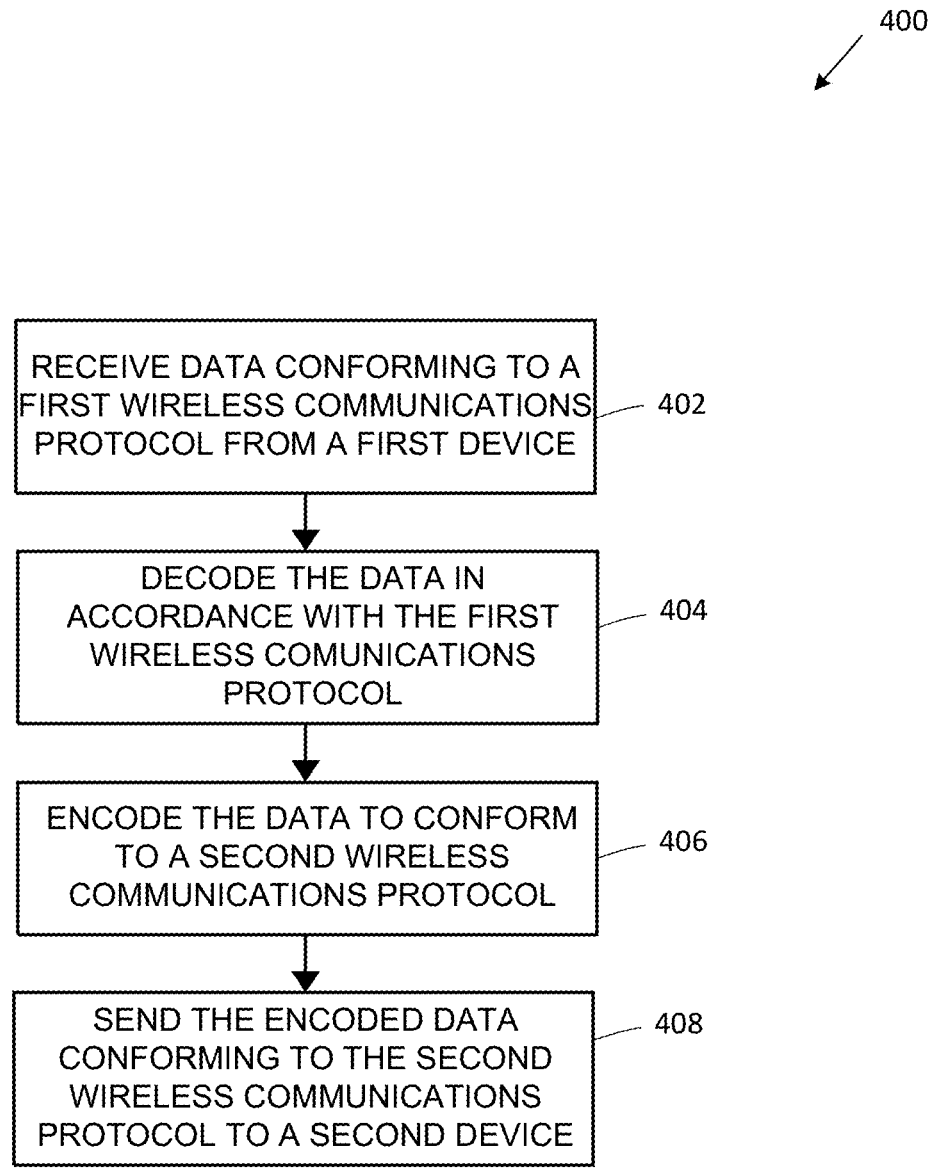
FIG. 4 is a flow diagram that illustrates a method 400 in accordance with an embodiment.

FIG. 4 is a flow diagram that illustrates a method 400 in accordance with an embodiment. In an embodiment, method 400 may be implemented by one or more processors and/or other components of a PWAP, such as communications engine 302 of PWAP 300, for example, as shown in FIG. 3.

Method 400 begins when one or more processors receive data from a first device conforming to a first communications protocol (block 402). This may include, for example, PWAP 224 receiving data from field communicator 216, as shown in FIG. 2, conforming to a standard wireless communication protocol (block 402). The standard wireless communication protocol may include a WLAN or a BLUETOOTH protocol, for example. This may also include, for example, PWAP 224 receiving data from a plant network device, such as workstation 204, for example, as shown in FIG. 2, conforming to a wireless industrial automation protocol (block 402). The wireless industrial automation protocol may include, for example, a WirelessHART or an ISA 100.11a communications protocol.

Method 400 may include one or more processors decoding the data in accordance with the first wireless communications protocol (block 404). This may include, for example, PWAP 224 decoding data received from field communicator 216 (block 402) in accordance with the standard wireless communications protocol (block 404). This may also include, for example, PWAP 224 decoding the data received from a plant network device, such as workstation 204, for example, (block 402) in accordance with a WirelessHART or an ISA 100.11a communications protocol (block 404).

Method 400 may include one or more processors encoding the decoded data (block 404) to conform to a second wireless communications protocol (block 406). This may include, for example, PWAP 224 encoding the data decoded from field communicator 216 (block 404) in accordance with a WirelessHART or an ISA 100.11a communications protocol (block 406). This may also include, for example, PWAP 224 encoding the data decoded from workstation 204, for example (block 404) in accordance with a WLAN or a BLUETOOTH communications protocol (block 406).

Method 400 may include one or more processors sending the data encoded in accordance with the second wireless communications protocol (block 406) to a second device (block 408). This may include, for example, PWAP 224 sending the encoded data (block 406) that was received (block 402) and decoded from field communicator 216 (block 404) to a plant network device (block 408), such as workstation 204, for example, conforming to a WirelessHART or an ISA 100.11a communications protocol. This may also include, for example, PWAP 224 sending the encoded data (block 406) that was received (block 402) and decoded from a plant network device, such as workstation 204, for example, (block 404) to field communicator 216, for example, conforming to a WLAN or BLUETOOTH communications protocol (block 408).

Although the present disclosure illustrates several embodiments in which a plant wireless access point is utilized in a plant environment, various embodiments include the plant wireless access point being implemented in any suitable location for which wireless protocol conversion is useful. For example, the plant wireless access point may be implemented to control field devices, or other types of devices, that are implemented in an environment separate from and/or external to a plant environment. Examples of such field devices may include pipelines, pumping stations, wellheads, oil rigs, etc. As will be appreciated by those of ordinary skill in the relevant art(s), the plant wireless access point as discussed herein may be modified to communicate with the suitable devices that control, command, and/or communicate with these field devices based upon each respective application. That is, the process control system described in FIG. 2 that interfaces with PWAP 224 may be replaced by the appropriate control elements utilized in each relevant application that communicate with other types of field devices.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a specialpurpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for implementing a data modeling studio for configuring and executing models as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed is:

1. In a plant wireless access point (PWAP), a method for facilitating communications between a first plant device in a process plant and a field communicator, comprising:
   encoding, by one or more processors, data received from the field communicator conforming to a standard wireless communications protocol to conform to a wireless industrial automation protocol to provide plant device encoded data, the wireless industrial automation protocol defining an authentication procedure for provisioning plant devices;
   encoding, by one or more processors, data received from the first plant device conforming to the wireless industrial automation protocol to conform to the standard wireless communications protocol to provide field communicator encoded data; and
   sending, by one or more processors, the plant device encoded data and the field communicator encoded data to the first plant device and to the field communicator, respectively, to facilitate communications between the first plant device and the field communicator;
   receiving, data from the field communicator in accordance with the standard wireless communications protocol that includes provisioning instructions and authentication information for a second plant device; and
   communicating, by one or more processors, with the second plant device to provision the second plant device into a wireless network including the PWAP, the first plant device, and the second plant device using the authentication procedure defined by the wireless industrial automation protocol,
   wherein the standard wireless communications protocol and the wireless industrial automation protocol are different protocols.

2. The method of claim 1, wherein the wireless industrial automation protocol comprises:
   a highway addressable remote transducer (HART) protocol, and
   wherein the standard wireless communications protocol comprises one or more of:
      a wireless personal area network (PAN) protocol; and
      a wireless local area network (WLAN) protocol.

3. The method of claim 1, further comprising:
   facilitating communications, by one or more processors, between the field communicator and a plant automation network.

4. The method of claim 1, wherein the act of sending the plant device encoded data and the field communicator encoded data to the first plant device and to the field communicator, respectively, comprises:
   exchanging the plant device encoded data and the field communicator encoded data between the first plant device and the field communicator to perform one or more of:
   calibrating the first plant device;
   configuring the first plant device;
   performing diagnostics on the first plant device;
   updating software corresponding to the first plant device; and
   updating firmware corresponding to the first plant device.

5. The method of claim 3, wherein the first plant device is part of a control loop controlled by the plant automation network to perform a process control operation, and
   wherein the act of facilitating communications between the field communicator and the plant automation network comprises:
   facilitating access by the field communicator to one or more control loop parameters as part of a loop checkout function.

6. The method of claim 1, further comprising:
   determining, by one or more processors, a location of the field communicator in relation to the PWAP.

7. A plant wireless access point (PWAP) associated with a process plant, comprising:
   a first network interface configured to receive first and second data from a field communicator conforming to a standard wireless communications protocol;
   a second network interface configured to receive data from a first and a second plant device conforming to a wireless industrial automation protocol that defines an authentication procedure for provisioning plant devices; and
   a processor configured to:
      encode the first and second data received from the field communicator to conform to the wireless industrial automation protocol to provide first and second plant device encoded data, respectively;
      encode the data received from the first plant device to conform to the standard wireless communications protocol to provide field communicator encoded data, and
   wherein:
   the first network interface is further configured to send the field communicator encoded data to the field communicator,
   the second network interface is further configured to send the first plant device encoded data to the first plant device,
   the second data received from the field communicator in accordance with the standard wireless communications protocol includes provisioning instructions and authentication information for the second plant device,
   the processor is further configured to communicate with the second plant device to provision the second plant device into a wireless network including the PWAP, the first plant device, and the second plant device using the authentication procedure defined by the wireless industrial automation protocol, and
   the standard wireless communications protocol and the standard wireless communications protocol are different protocols.

8. The PWAP of claim 7, wherein the wireless industrial automation protocol comprises:

a highway addressable remote transducer (HART) protocol, and wherein the standard wireless communications protocol comprises one or more of:
- a wireless personal area network (PAN) protocol; and
- a wireless local area network (WLAN) protocol.

9. The PWAP of claim 7, wherein the processor is further configured to control the first and second network interfaces to facilitate communications between the field communicator and a plant automation network.

10. The PWAP of claim 7, wherein the processor is further configured to control the first and second network interfaces to facilitate the field communicator performing one or more of:
- calibrating the first plant device;
- configuring the first plant device;
- performing diagnostics on the first plant device;
- updating software corresponding to the first plant device; and
- updating firmware corresponding to the first plant device.

11. The PWAP of claim 9, wherein the first plant device is part of a control loop controlled by the plant automation network to perform a process control operation, and
wherein the processor is further configured to control the first and second network interfaces to enable the field communicator to access one or more control loop parameters as part of a loop checkout function.

12. The PWAP of claim 7, further comprising:
wherein the processor is further configured to determine a location of the field communicator in relation to the PWAP.

13. A non-transitory, tangible computer-readable medium storing machine readable instructions in a plant wireless access point (PWAP) associated with a process plant for facilitating communications between a first plant device in a process plant and a field communicator, that when executed by a processor, cause the processor to:
- receive first and second data from the field communicator conforming to a standard wireless communications protocol, the second data including provisioning instructions and authentication information for a second plant device;
- receive data from the first and second plant device conforming to a wireless industrial automation protocol that defines an authentication procedure for provisioning plant devices;
- encode the first and second data received from the field communicator to conform to the wireless industrial automation protocol to provide first and second plant device encoded data, respectively;
- encode the data received from the first plant device to conform to the standard wireless communications protocol to provide field communicator encoded data;
- send the field communicator encoded data to the field communicator;
- send the first plant device encoded data to the first plant device; and
- communicate with the second plant device to provision the second plant device into a wireless network including the PWAP, the first plant device, and the second plant device using the authentication procedure defined by the wireless industrial automation protocol, and
wherein the standard wireless communications protocol and the standard wireless communications protocol are different protocols.

14. The non-transitory, tangible computer-readable medium of claim 13, wherein the wireless industrial automation protocol comprises:
a highway addressable remote transducer (HART) protocol, and wherein the standard wireless communications protocol comprises one or more of:
- a wireless personal area network (PAN) protocol; and
- a wireless local area network (WLAN) protocol.

15. The non-transitory, tangible computer-readable medium of claim 13, further including instructions, that when executed by the processor, cause the processor to:
control the first and second network interfaces to facilitate communications between the field communicator and a plant automation network.

16. The non-transitory, tangible computer-readable medium of claim 13, further including instructions, that when executed by the processor, cause the processor to:
facilitate the field communicator performing one or more of:
- calibrating the first plant device;
- configuring the first plant device;
- performing diagnostics on the first plant device;
- updating software corresponding to the first plant device; and
- updating firmware corresponding to the first plant device.

17. The non-transitory, tangible computer-readable medium of claim 15, wherein the first plant device is part of a control loop controlled by the plant automation network to perform a process control operation, and
further including instructions, that when executed by the processor, cause the processor to:
control the first and second network interfaces to enable the field communicator to access one or more control loop parameters as part of a loop checkout function.

18. The non-transitory, tangible computer-readable medium of claim 13, further including instructions, that when executed by the processor, cause the processor to:
determine a location of the field communicator in relation to the PWAP.

19. The method of claim 1, wherein the act of provisioning the second plant device into the wireless network is performed exclusively via wireless communications between the field communicator, the PWAP, and the second plant device.

20. The method of claim 1, further comprising:
connecting, by one or more processors, to the Internet by wirelessly communicating with one or more components associated with the process plant to facilitate the field communicator downloading data from the Internet via the PWAP, the one or more components associated with the process plant being different than the field communicator, the first plant device, and the second plant device, and
wherein the data downloaded from the Internet includes documentation, videos, or help content regarding the configuration and operation of the first and the second plant device.

21. The PWAP of claim 7, wherein the processor is further configured to provision the second plant device into the wireless network by communicating exclusively with the field communicator and the second plant device via wireless communications.

22. The PWAP of claim 7, wherein the processor is further configured to connect to the Internet by wirelessly communicating with one or more components associated with the process plant to facilitate the field communicator downloading data from the Internet via the PWAP, the one or more components associated with the process plant being different than the field communicator, the first plant device, and the second plant device, and wherein the data downloaded from the Internet includes documentation, videos, or help content regarding the configuration and operation of the first and the second plant device.

23. The non-transitory, tangible computer-readable medium of claim 13, further including instructions, that when executed by the processor, cause the processor to provision the second plant device into the wireless network by communicating exclusively with the field communicator and the second plant device via wireless communications.

24. The non-transitory, tangible computer-readable medium of claim 13, further including instructions, that when executed by the processor, cause the processor to connect to the Internet by wirelessly communicating with one or more components associated with the process plant to facilitate the field communicator downloading data from the Internet via the PWAP, the one or more components associated with the process plant being different than the field communicator, the first plant device, and the second plant device, and wherein the data downloaded from the Internet includes documentation, videos, or help content regarding the configuration and operation of the first and the second plant device.

* * * * *